United States Patent
Stranczl et al.

(10) Patent No.: US 9,671,755 B2
(45) Date of Patent: Jun. 6, 2017

(54) ASSEMBLY SYSTEM UTILIZING A FLAT, ELASTIC LOCKING ELEMENT

(71) Applicant: Nivarox-FAR S.A., Le Locle (CH)

(72) Inventors: Marc Stranczl, Nyon (CH); Daniel Mallet, Le Belieu (FR); Marco Verardo, Les Bois (CH)

(73) Assignee: Nivarox-FAR S.A., Le Locle (CH)

( * ) Notice: Subject to any disclaimer, the term of this patent is extended or adjusted under 35 U.S.C. 154(b) by 164 days.

(21) Appl. No.: 14/508,268

(22) Filed: Oct. 7, 2014

(65) Prior Publication Data

US 2015/0098311 A1  Apr. 9, 2015

(30) Foreign Application Priority Data

Oct. 9, 2013  (EP) ..................... 13187833

(51) Int. Cl.
*G04B 13/02*  (2006.01)
*G04B 17/06*  (2006.01)
(Continued)

(52) U.S. Cl.
CPC .......... *G04B 13/026* (2013.01); *F16B 21/125* (2013.01); *F16B 21/20* (2013.01);
(Continued)

(58) Field of Classification Search
CPC .. G04B 13/022; G04B 13/026; G04B 17/066; F16B 21/125; F16B 21/20
See application file for complete search history.

(56) References Cited

U.S. PATENT DOCUMENTS 2,321,157 A * 6/1943 Rees ................. F16B 21/20
411/521
2,421,115 A * 5/1947 Carlson ................ H02K 1/28
29/520
(Continued)

FOREIGN PATENT DOCUMENTS

CH       703 961 A2    4/2012
EP     1 705 533 A1    9/2006
(Continued)

OTHER PUBLICATIONS

European Search Report issued Mar. 26, 2014, in European Application No. 13187833 filed Oct. 9, 2013 (with English Translation).

*Primary Examiner* — Vit W Miska
(74) *Attorney, Agent, or Firm* — Oblon, McClelland, Maier & Neustadt, L.L.P.

(57) ABSTRACT

The invention relates to an assembly system including a member made of at least a first material including a staff and a shoulder, the staff of the member being received in an aperture of a part made of a second material having little or no plastic domain. According to the invention, the assembly system includes a locking element made of a third material arranged to elastically attach the part between the shoulder of said member and the locking element and in that the locking element is a washer whose internal wall radially grips the staff of said member and whose peripheral portion exerts an elastic radial force vertical to the shoulder of said member in order to secure the assembly of the member-part-locking element.

21 Claims, 3 Drawing Sheets

(51) Int. Cl.
   *F16B 21/12*   (2006.01)
   *F16B 21/20*   (2006.01)
(52) U.S. Cl.
   CPC ......... *G04B 13/022* (2013.01); *G04B 17/066*
   (2013.01); *Y10T 29/49581* (2015.01)

(56) References Cited

U.S. PATENT DOCUMENTS

| | | | | |
|---|---|---|---|---|
| 3,032,807 | A * | 5/1962 | Lanius, Jr. | F16B 21/20 16/97 |
| 3,762,158 | A * | 10/1973 | Forrester, Jr. | G04B 47/06 368/2 |
| 3,827,232 | A * | 8/1974 | Bassett | G04F 3/022 368/100 |
| 4,795,930 | A * | 1/1989 | Schwartz | G04C 3/008 310/43 |
| 4,834,603 | A * | 5/1989 | Holton | B21D 22/04 411/517 |
| 5,195,860 | A * | 3/1993 | Steyn | F16B 21/20 411/353 |
| 5,395,193 | A * | 3/1995 | Krumme | F16B 1/0014 29/20 |
| 5,584,631 | A * | 12/1996 | Krumme | F16B 1/0014 411/339 |
| 5,803,692 | A * | 9/1998 | Postadan | F16B 21/20 411/520 |
| 5,833,422 | A * | 11/1998 | Haga | F16D 1/0858 411/520 |
| 6,126,308 | A * | 10/2000 | Hepfer | G04B 1/08 368/124 |
| 6,672,814 | B1 * | 1/2004 | Kotlarski | B60S 1/0447 15/250.31 |
| 6,705,813 | B2 * | 3/2004 | Schwab | F16B 21/20 411/156 |
| 6,997,662 | B2 * | 2/2006 | Nishikawa | B62D 25/2072 411/433 |
| 2008/0037374 | A1 * | 2/2008 | Chu | G04G 9/02 368/82 |
| 2011/0005055 | A1 | 1/2011 | Gigandet et al. | |

FOREIGN PATENT DOCUMENTS

| | | |
|---|---|---|
| EP | 2 273 322 A1 | 1/2011 |
| EP | 2 363 762 A1 | 9/2011 |

* cited by examiner

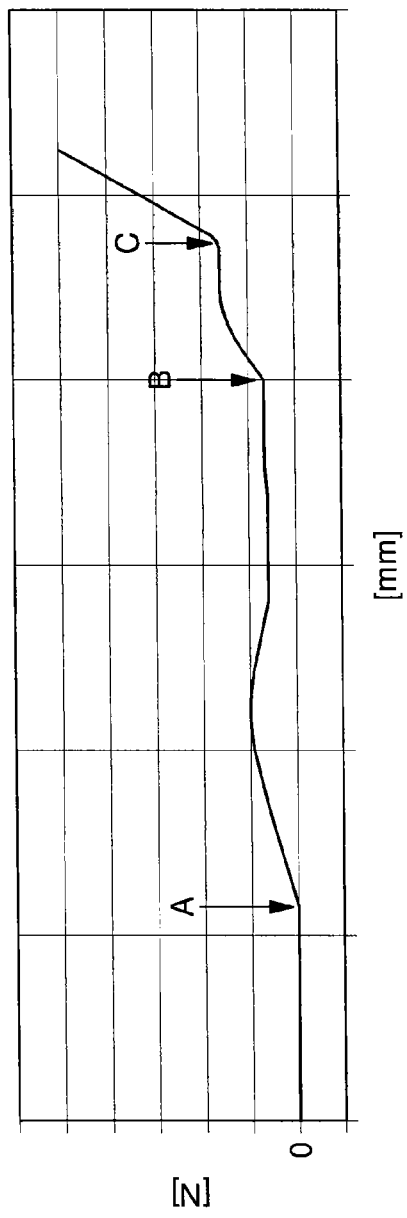
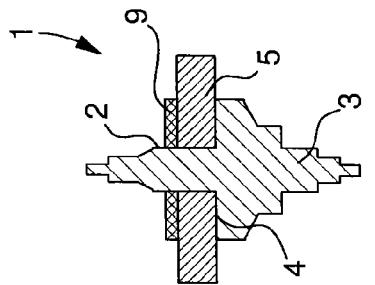
Fig. 3
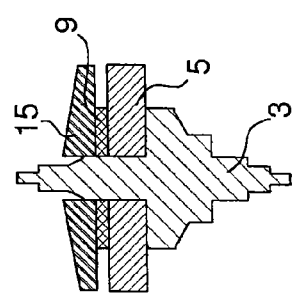
Fig. 8
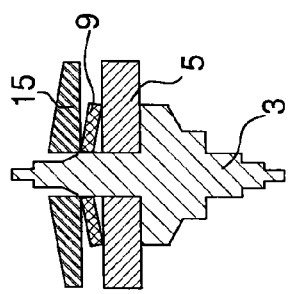
Fig. 7
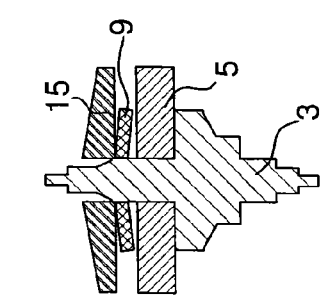
Fig. 6
Fig. 5
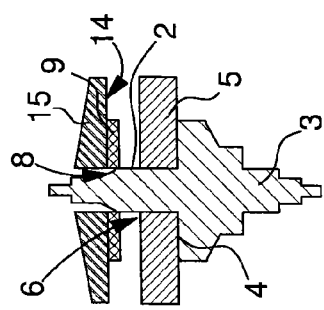
Fig. 4

ASSEMBLY SYSTEM UTILIZING A FLAT, ELASTIC LOCKING ELEMENT

This application claims priority from European Patent Application No. 13187833.2 filed Oct. 9, 2013, the entire disclosure of which is hereby incorporated herein by reference.

FIELD OF THE INVENTION

The invention relates to an assembly system utilising a substantially flat, elastic locking element making it possible to assemble a part made of a material which has no usable plastic domain, i.e. with a very limited plastic domain, to a member comprising a different type of material.

BACKGROUND OF THE INVENTION

Current assemblies including a silicon-based part are generally secured by bonding. This type of operation requires extremely delicate application which makes it expensive.

SUMMARY OF THE INVENTION

It is an object of the present invention to overcome all or part of the aforecited drawbacks by providing an adhesive-free assembly which can secure a part made of a material with no plastic domain to a member comprising a ductile material, such as, for example, a metal or metal alloy.

To this end, the invention relates to an assembly system including a member made of at least a first material including a staff, a shaft or an arbor and a shoulder, the shaft of the member being received in the aperture of a part made of a second material, characterized in that the assembly system includes a locking element made of a third material arranged to elastically attach the part between the shoulder of said member and the locking element, and in that the locking element is a washer whose internal wall radially grips the shaft of said member and whose peripheral portion exerts an elastic axial force vertical to the shoulder of said member in order to secure the assembly of the member-part-locking member.

This configuration advantageously enables the member-part-locking element assembly to be secured without adhesive bonding to an ordinary, precision controlled member, while ensuring that the part is not subject to destructive stresses, even if it is formed, for example, from a silicon-based material. Indeed, the Applicant was surprised to be able to secure the member-part-locking element assembly, particularly in relative rotation, with such great structural simplicity, since preconceived ideas as to the mechanical resistance of parts made from silicon-based materials have, to date, required that no axial force is applied to a part made of material having little or no plastic domain.

In accordance with other advantageous features of the invention:
the third material includes a metal or a metal alloy whose resistance to relaxation, after 10,000 hours at a temperature of 70° C. is equal to at least 50% of the applied force representing 75% of the stress necessary to obtain 0.2% plastic deformation of the third material in order to maintain the secure assembly of the member-part-locking element;
the third material includes copper, brass, nickel silver (also called "maillechort" or "new silver"), ARCAP alloy, Pfinodal alloy, Spinodal alloy, Durnico alloy, Durimphy alloy, Cu—Be alloy and/or 20AP steel;
the height to width ratio of the locking element in cross-section in an axial plane is between 0.1 and 5;
the locking element is chamfered to prevent any damage to the second material;
the second material is silicon-based such as silicon, quartz, silicon oxide, silicon nitride or silicon carbide;
said at least one first material includes a metal or a metal alloy;
the shaft and the shoulder are in one piece.

Further, the invention relates to a timepiece, characterized in that it includes at least one assembly system according to any of the preceding variants, the part with no plastic domain being able to be a wheel, pallets or a balance spring.

Finally, the invention relates to a method of manufacturing an assembly system including the following steps:
a) forming a member made of at least a first material including a staff, an arbor or a shaft and a shoulder, a part made of a second material with an aperture and a locking element in the form of a washer made from a third material and whose hole is smaller than the staff of shaft of said member;
b) inserting the shaft of said member freely into the aperture of the part;
c) placing the shaft against the hole in the locking element and forcibly sliding the locking element against the shaft using a tool to deform the locking element so that the peripheral portion of the locking element is the closest to the part;
d) stopping and removing said tool when a predefined force less than the yield strength of the third material is reached between the tool and the shoulder of said member.

This method advantageously makes it possible to secure the member-part-locking element assembly in a simple, elastic manner and with no possible relative movement. Indeed, advantageously according to the invention, only one locking element is provided and deformed to achieve purely elastic peripheral clamping. It is easily understood that a method of this type makes it possible to secure the assembly of the member-part-locking element while adapting to manufacturing variations in the various components.

Finally, surprisingly, the axial stress exerted by the peripheral portion of the locking element in the method does not cause any breakage of the second material having little or no plastic domain. This technical advantage makes it possible to considerably simplify the assembly of parts having little or no plastic domain onto a pivoting staff. It is understood in particular that it is not necessary to provide any adhesive, additional locking cap or complementary cover shapes to secure the parts to each other particularly as regards relative movements about the axis of rotation of the pivoting shaft.

In accordance with other advantageous features of the invention:
step d) is stopped when the force applied by said tool is comprised between 20% and 90% of the yield strength of the third material;
the third material includes a metal or a metal alloy whose resistance to relaxation, after 10,000 hours at a temperature of 70° C. is equal to at least 50% of the force applied in step d) representing 75% of the stress necessary to obtain 0.2% plastic deformation of the third material in order to maintain the secure assembly of the member-part-locking element;

the third material includes copper, brass, nickel silver (also called "maillechort" or "new silver"), ARCAP alloy, Pfinodal alloy, Spinodal alloy, Durnico alloy, Durimphy alloy, Cu—Be alloy and/or 20AP steel;

the height to width ratio of the locking element in cross-section in an axial plane is between 0.1 and 5;

the locking element is chamfered to prevent any damage to the second material;

the second material is silicon-based such as silicon, quartz, silicon oxide, silicon nitride or silicon carbide;

said at least first material includes a metal or a metal alloy;

the part is a timepiece wheel set, a timepiece pallets or a timepiece balance spring.

BRIEF DESCRIPTION OF THE DRAWINGS

Other features and advantages will appear clearly from the following description, given by way of non-limiting illustration, with reference to the annexed drawings, in which:

FIG. 3 is a graphical representation of the force applied in the method according to the axial position of the tool exerting said force;

FIGS. 4 to 8 are schematic cross-sections of successive steps of the method according to the invention;

DETAILED DESCRIPTION OF PREFERRED EMBODIMENTS

Figure 1:
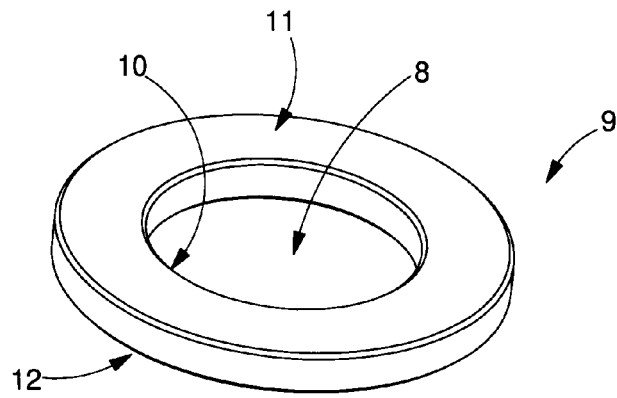
FIG. 1 is a perspective view of a locking element according to the invention.

As explained above, the invention relates to a system of assembling a part, made of a material having no usable plastic domain, i.e. with a very limited plastic domain, to a member comprising a different type of material.

This assembly system was devised for applications within the field of horology. However, other domains may very well be envisaged, such as, notably aeronautics, jewellery, the automobile industry or tableware.

In the field of horology, this assembly is made necessary by the increasing part played by fragile materials such as silicon-based materials like doped or non-doped single crystal (or polycrystalline) silicon, silicon oxide, such as quartz or silica, single crystal or polycrystalline corundum or, more generally, alumina, silicon nitride and silicon carbide. By way of example, it is possible to envisage forming the balance spring, balance, pallets, bridges or even wheel sets, such as the escape wheels, completely or partially from a base of fragile materials.

However, always being able to use ordinary steel staffs, shafts or arbors, the fabrication of which has been mastered, is a constraint which is difficult to reconcile with the use of parts having no plastic domain. Indeed, when tests were carried out, it was impossible to drive in a steel staff and this systematically broke fragile parts, i.e. those with no usable plastic domain. For example, it became clear that the shearing generated by the metallic staff entering the aperture in a silicon component systematically breaks the component.

This is why the invention relates to an assembly system 1, 101, 121, 201 including a member 3, 103, 123, 203 made of at least a first material including a staff 2, 102, 122, 202 and a shoulder 4, staff 2 of the member being received in the aperture 6 of a part 5, 105, 205 made of a second material having little or no plastic domain.

It is thus understood that staff 2, 102, 122, 202 and shoulder 4 may be in a single piece using a single first material or that staff 2, 102, 122, 202 and shoulder 4 of member 3, 103, 123, 203 may be formed of several materials and/or several portions.

Advantageously according to the invention, the assembly system 1, 101, 121, 201 includes a locking element 9, 109, 129, 209 made of a third material arranged to elastically attach part 5, 105, 205 between shoulder 4 of member 3, 103, 123, 203 and locking element 9, 109, 129, 209. As better illustrated in FIG. 8, advantageously according to the invention, part 5 is clamped against shoulder 4 of member 3 by the elastic force of locking element 9. The simplicity of assembly system 1, 101, 121, 201 according to the invention, which requires no adhesive, additional locking cap, complementary cover shapes or plastic deformation such as creep, is immediately clear.

Preferably according to the invention, locking element 9, 109, 129, 209 is a washer whose internal wall 10 radially grips staff 2, 102, 122, 202 of member 3, 103, 123, 203 and whose peripheral portion 13 exerts an elastic axial force vertical to shoulder 4 of member 3, 103, 123, 203 in order to secure the assembly of member 3, 103, 123, 203-part 5, 105, 205-locking element 9, 109, 129, 209.

Figure 2:
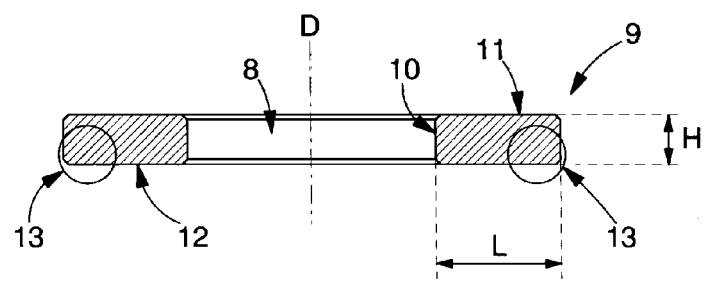
FIG. 2 is a cross-section in an axial plane of a locking element of FIG. 1.

FIGS. 1 and 2 also show that locking element 9, 109, 129, 209 includes an upper surface 11 intended to come into contact with a preferably flat tool 15 and a lower surface 12 intended to come into contact with the upper surface of part 5, 105, 205.

Indeed, as explained below, surprisingly, the axial stress exerted by peripheral portion 13 of locking element 9, 109, 129, 209 in the method does not cause any breakage of the second material which has little or no plastic domain. This technical advantage makes it possible to considerably simplify the assembly of part 5, 105, 205 onto, for example a pivoting staff 2, 102, 122, 202. This advantage is obtained, in particular since peripheral portion 13 of locking element 9, 109, 129, 209 bears on shoulder 4 and not in a cantilevered position with respect to shoulder 4. It is therefore important that the surface of locking element 9, 109, 129, 209 does not exceed that of shoulder 4.

In the example illustrated in FIGS. 1 and 2, locking element 9 is symmetrical, i.e. surfaces 11 and 12 may be either the upper or lower surface. However, this symmetry is merely optional and preferably applied to prevent handling errors during manufacture.

The elastic assembly of locking element 9, 109, 129, 209 is advantageously obtained by using a third material which includes a metal or a metal alloy whose resistance to relaxation is equal to at least 50% of the applied force. Tests for determining this percentage were carried out after 10,000 hours at a temperature of 70° C. and under a force of 75% of the stress necessary to obtain 0.2% plastic deformation, i.e. substantially 75% of the elastic limit of the third material.

Resistance of more than 50% was observed when the third material includes copper, brass, nickel silver (also called "maillechort" or "new silver"), ARCAP alloy, and even more than 85% when the third material includes Pfinodal alloy, Spinodal alloy, Durnico alloy, Durimphy alloy, Cu—Be alloy and 20AP steel.

For considerations specific to horology, locking element 9, 109, 129, 209 is, even more preferably, chosen from among the above materials which do not possess ferromagnetic properties, to be insensitive to magnetic fields, i.e., copper, brass, nickel silver (also called "maillechort" or "new silver"), ARCAP alloy, Pfinodal alloy, Spinodal alloy, Cu—Be alloy and Durimphy alloy.

As better illustrated in FIGS. 1 and 2, preferably according to the invention, the height H to width L ratio (H/L) of locking element 9, 109, 129, 209 in cross-section in an axial plane is between 0.1 and 5. Thus, it is important to properly select length L to obtain a peripheral portion 13 which is sufficiently far from the centre of axis D to obtain a sufficiently high lever arm to offer sufficient clamping to secure an assembly together. At the same time, a height H must also be properly selected in order to obtain a minimum height to sufficiently protect the second material having little or no plastic domain, and a maximum height to still obtain the intermediate deformation explained below. It is therefore understood that ratio H/L must be adapted to the anticipated application.

According to another preference, locking element 9, 109, 129, 209 is chamfered to prevent any breakage of the second material which has little or no plastic domain. Indeed, as explained below, depending on the geometry of the intermediate deformation, a chamfer may prevent locking element 9, 109, 129, 209 from entering into contact on the upper surface of part 5, 105, 205 via a sharp edge capable of generating excessive stress and/or pressure on a minimal surface.

Thus, advantageously according to the invention, said at least first material formed for member 3, 103, 123, 203 may include a large variety of materials, such as, for example, a metal or a metal alloy.

Figure 9:
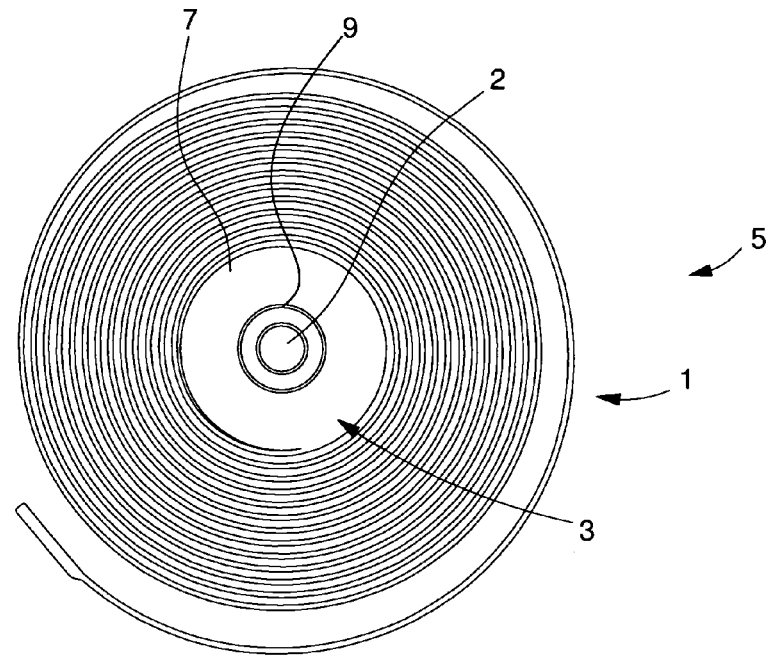
FIGS. 9 and 10 are partial, schematic views of a timepiece movement including assembly systems according to the invention.

The method of manufacturing a first embodiment of assembly system 1 according to the invention illustrated in FIG. 9 is explained below with reference to FIGS. 3 to 8.

The method includes a first step a) consisting in forming each portion of assembly system 1. Thus, step a) includes a phase intended to form a member 3 made of at least a first material including a staff 2 and a shoulder 4 which may or may not be in a single piece, a second phase intended to form a part 5 made of a second material having lithe or no plastic domain such as, for example, a silicon-based material, with an aperture 6 and a third phase intended to form a locking element 9 in the form of a washer made of a third material and whose hole 8 is smaller than staff 2 or member 3. It is understood that in step a), the order of execution of the phases is of no importance.

The method continues with a second step b) consisting in passing staff 2 of member 3 freely into aperture 6 of part 5. Step b) is illustrated in FIG. 4.

Step c) continues the method and includes a first phase intended to place staff 2 against hole 8 in locking element 9. This first phase of step c) is also illustrated in FIG. 4. A tool 15 is also observed in FIG. 4. This tool 15 is preferably flat, i.e. has a substantially flat surface 14 intended to come into contact with upper surface 11 of locking element 9. It is thus noted that if locking element 9 is symmetrical as illustrated in FIGS. 1 and 2, assembly errors between upper surface 11 and lower surface 12 are eliminated.

Step c) continues with a second phase intended to forcibly slide locking element 9 against staff 2 using tool 15 so as to deform locking element 9 so that the peripheral portion 13 of locking element 9 is the closest to part 5 as illustrated in FIG. 5. It is clear that this second phase could be likened to a driving in operation.

This intermediate elastic deformation, which may cause isolated plastic deformations on internal wall 10, gives the impression that locking element 9 is a Belleville washer. However, this geometry is not stable, i.e. it is not a plastic deformation such as creep, and is caused solely by the force of tool 15. This intermediate elastic deformation is maximised by the use of hole 8 in locking element 9 which is smaller than staff 2 of member 3 and the use of tool 15 whose surface 14 is substantially flat.

This intermediate elastic deformation is of very great importance for the future assembly system 1 in that it applies the future axial stress to part 5 as illustrated in FIG. 6, not as close as possible to staff 2 but, via the lever arm of width L of locking element 9, on the peripheral portion 13 of locking element 9. It is thus understood that the cross-section of shoulder 4 of member 3 should preferably be substantially equal to or greater than that of locking element 9 to allow peripheral portion 13 to exert an axial elastic force vertical to shoulder 4 of member 3.

The method ends simply with step d) consisting in stopping and removing tool 15 when a predefined force less than the yield strength of the third material is reached between tool 15 and shoulder 4 of member 3. Indeed, once elastic clamping has been achieved between peripheral portion 13 of locking element 9 vertical to shoulder 4 of member 3, tool 15 is used to move internal wall 10 as close as possible to part 5 without exceeding, on peripheral portion 13, the yield strength of the third material used for locking element 9.

It is thus clear that, once tool 15 has been removed, it is not desirable for the entire width L of lower surface 12 of locking element 9 to exert a stress against part 5 but only, or mainly, on peripheral portion 13 thereof. The securing of the member 3-part 5-locking element 9 assembly is thus achieved only or mainly by an axial elastic force of peripheral portion 13 of locking element 9 vertical to shoulder 4 of member 3, combined with the radial gripping of inner wall 10 of locking element 9 against staff 2 of member 3.

FIG. 3 is a graphical representation of the force applied by tool 15 in the above method according to the axial position of tool 15. From arrow A, the second phase of step c) starts as illustrated in FIG. 5. From arrow B, peripheral portion 13 of locking element 9 starts to clamp part 5 as illustrated in FIG. 6. From arrow C, internal wall 10 of locking element 9 is moved as close as possible to part 5 as illustrated in FIG. 7 and any additional force from tool 15 exerts an internal stress on locking element 9 with no impact on the geometry of locking element 9.

It is therefore clear that the steps of the manufacturing method and the elements of the assembly system are very simple and easy to implement. Thus, according to a first embodiment illustrated in FIG. 9, it is possible to fix a balance spring 5 to a balance staff 2, by using an assembly system 1 of the invention. To achieve this, the collet 7 of balance spring 5 is secured between pivot 3 and locking element 9.

In order to minimise the risk of plastic deformation of locking element 9, 109, 129, 209, step d) is stopped when the force applied by tool 15 is comprised between 20% and 90% of the yield strength of the third material. Of course, the percentage must be adapted according to the anticipated application. During tests, it became clear that stopping step d) is entirely satisfactory when the force applied by tool 15 is substantially equal to 75% of the yield strength of the third material.

As explained above, the elastic assembly of locking element 9, 109, 129, 209 is advantageously obtained by using a third material which includes a metal or a metal alloy whose resistance to relaxation is equal to at least 50% of the applied force. Tests for determining this percentage were carried out after 10,000 hours at a temperature of 70° C. and under a force of 75% of the stress necessary to obtain 0.2% plastic deformation.

Resistance of more than 50% was observed when the third material includes copper, brass, nickel silver (also called "maillechort" or "new silver"), ARCAP alloy, and even more than 85% when the third material includes Pfinodal alloy, Spinodal alloy, Durnico alloy, Durimphy alloy, Cu—Be alloy and 20AP steel.

For considerations specific to horology, locking element 9, 109, 129, 209 is, even more preferably, chosen from among the above materials which do not possess ferromagnetic material, so as to be insensitive to magnetic fields, i.e., copper, brass, nickel silver (also called "maillechort" or "new silver"), ARCAP alloy, Pfinodal alloy, Spinodal alloy, Cu—Be alloy and Durimphy alloy.

As better illustrated in FIGS. 1 and 2, preferably according to the invention, the height H to width L ratio (H/L) of locking element 9, 109, 129, 209 in cross-section in an axial plane is between 0.1 and 5. Thus, it is important to properly select length L to obtain a peripheral portion 13 which is sufficiently far from the centre of axis D to obtain a sufficiently high lever arm to offer sufficient clamping to secure an assembly together. At the same time, the height must also be properly selected in order to obtain a minimum height to sufficiently protect the second material having little or no plastic domain, and a maximum height to still obtain the intermediate deformation explained below. It is therefore understood that ratio H/L must be adapted to the anticipated application.

According to another preference, locking element 9, 109, 129, 209 is chamfered to prevent any breakage of the second material. Indeed, as explained above, depending on the geometry of the intermediate deformation, a chamfer may prevent locking element 9, 109, 129, 209 from entering into contact on the upper surface of part 5, 105, 205 via a sharp edge capable of generating excessive stress on a minimal surface.

Thus, advantageously according to the invention, said at least one first material formed for member 3, 103, 123, 203 may include a large variety of materials, such as, for example, a metal or a metal alloy. It is thus understood that staff 2, 102, 122, 202 and shoulder 4 may be in a single piece using a single first material or that staff 2, 102, 122, 202 and shoulder 4 of member 3, 103, 123, 203 may be formed of several materials and/or several portions.

It is also understood that, as a result of the method of the invention, the second material having little or no plastic domain may include, in particular, silicon, quartz, corundum, silicon oxide, silicon nitride or silicon carbide with no risk of breakage.

Figure 10:
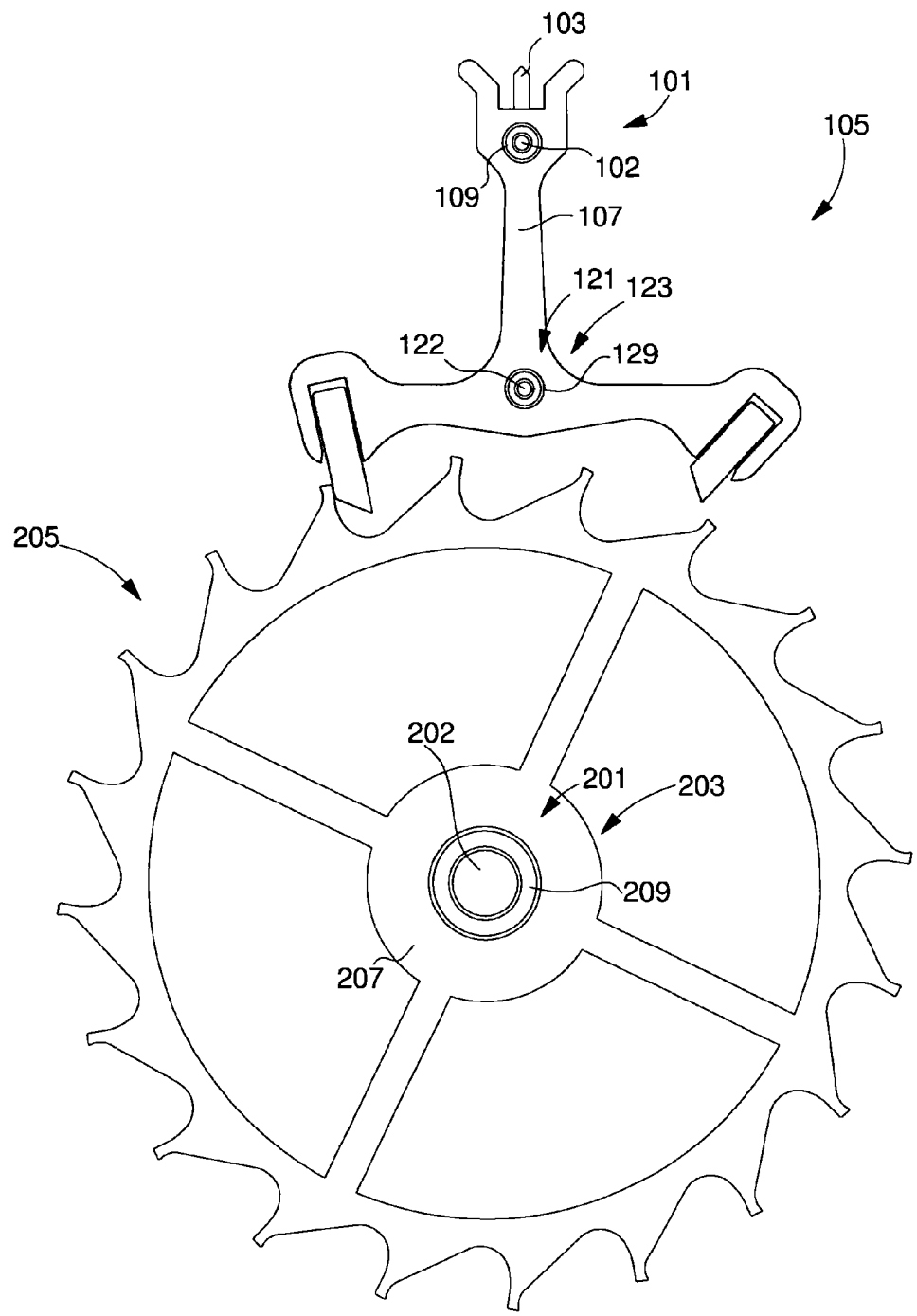

FIG. 10 shows other embodiments of assembly systems 101, 121, 201 according to the invention within the field of horology. Pallets 105, by way of example, may include two assemblies 101, 121 according to the invention, respectively for securing the dart 103 and pin 123 to the pallet-lever 107.

As shown in FIG. 10, each assembly system 101, 121 includes pallet-lever 107 which is secured between staff 102 of the dart 103 or staff 122 of the pin 123 and locking element 109, 129. It is thus clear that each assembly system 101, 121 is sufficiently resistant to avoid generating relative movements between its components.

In the same Figure, an escape wheel, and more generally wheel 205 includes, by way of example, an assembly system 201 intended to secure a pivot 203 to wheel 205. As shown in FIG. 10, assembly system 201 includes a hub 207 which is secured between staff 202 of pivot 203 and locking element 209.

It is thus immediately clear that the example assembly system 201 can be applied to any type of wheel set. Further, pin 203 may comprise a pinion in a single part to form a complete wheel set.

Of course, this invention is not limited to the illustrated example but is capable of various variants and alterations that will appear to those skilled in the art. In particular, locking element 9, 109, 129, 209 can have a different geometry without departing from the scope of the invention.

Tool 15 could also include a substantially conical surface 14 to substantially follow the Belleville washer shape obtained during the intermediate elastic deformation.

Further, aperture 6 in part 5, 105, 205 is not limited to a circular shape and/or part 5, 105, 205 may be partially pierced below locking element 9, 109, 129, 209. Thus, by way of example, balance spring 5 of FIG. 9 could be replaced by the balance spring 10 including a collet 41 whose aperture is substantially trefoil-shaped of EP Patent No 2363762 which is incorporated by reference in the present patent application, without losing any of the aforecited advantages.

Finally, different "fragile" materials from silicon or alumina based materials may be envisaged, such as, for example, zirconium or titanium based ceramics, or glass. Locking element 9, 109, 129, 209 may also be formed from a base of amorphous metals also called metallic glasses.

What is claimed is:
1. An assembly system comprising:
a member made of at least a first material including a staff and a shoulder, the staff of the member being received in the aperture of a part made of a second material,
wherein the assembly system includes a locking element made of a third material arranged to elastically attach the part between the shoulder of said member and the locking element, and
wherein the locking element is a washer whose internal wall radially grips the staff of said member and, after the washer is moved to contact the part in order to secure the member-part-locking element assembly, the washer is elastically deformed to exert an axial force to the shoulder of said member that is larger along peripheral portions of the washer than at radially inward portions of the washer, and
wherein the second material is silicon-based.

2. The assembly system according to claim 1, wherein the third material includes a metal or a metal alloy whose resistance to relaxation, after 10,000 hours at a temperature of 70° C. is equal to at least 50% of the applied force representing 75% of the stress necessary to obtain 0.2% plastic deformation of the third material in order to maintain the secure assembly of the member-part-locking element.

3. The assembly system according to claim 2, wherein the third material includes copper, brass, and/or nickel silver.

4. The assembly system according to claim 1, wherein the height (H) to width (L) ratio (H/L) of the locking element in cross-section in an axial plane is between 0.1 and 5.

5. The assembly system according to claim 1, wherein the locking element is chamfered to prevent any breakage of the second material.

6. The assembly system according to claim 1, wherein the second material includes silicon, quartz, silicon oxide, silicon nitride or silicon carbide.

7. The assembly system according to claim 1, wherein said at least one first material includes a metal or a metal alloy.

8. The assembly system according to claim 1, wherein the staff and the shoulder are in a single piece.

9. A timepiece wherein the timepiece includes at least one assembly system according to claim 1.

10. The timepiece according to claim 9, wherein the part made of a second material is a wheel set, pallets or a balance spring.

11. A method of manufacturing an assembly system comprising the following steps:
 forming a member made of at least a first material including a staff and a shoulder, a part made of a second material with an aperture and a locking element in a form of a washer made from a third material and whose hole is smaller than the staff of said member;
 passing the staff of said member freely into the aperture of the part;
 placing the staff against the hole in the locking element and forcibly sliding the locking element against the staff using a tool to elastically deform the locking element so that the peripheral portion of the locking element is closest to the part; and
 stopping and removing said tool when a predefined force less than the yield strength of the third material is reached between the tool and the shoulder of said member, and
 wherein the second material is silicon-based.

12. The method according to claim 11, wherein the stopping and removing is stopped when the force applied by said tool is comprised between 20% and 90% of the yield strength of the third material.

13. The method according to claim 11, wherein the third material includes a metal or a metal alloy whose resistance to relaxation, after 10,000 hours at a temperature of 70°C. is equal to a least 50% of the force applied in the stopping and removing representing 75% of the stress necessary to obtain 0.2% plastic deformation of the third material in order to maintain the secure assembly of the member-part-locking element.

14. The method according to claim 13, wherein the third material includes copper, brass, and/or nickel silver.

15. The method according to claim 11, wherein the height (H) to width (L) ratio (H/L) of the locking element in cross-section in an axial plane is between 0.1 and 5.

16. The method according to claim 11, wherein the locking element is chamfered to prevent any breakage of the second material.

17. The method according to claim 11, wherein the second material includes silicon, quartz, silicon oxide, silicon nitride or silicon carbide.

18. The method according to claim 11, wherein said at least first material includes a metal or a metal alloy.

19. The method according to claim 11, wherein the part is a timepiece wheel set.

20. The method according to claim 11, wherein the part is pallets of a timepiece.

21. The method according to claim 11, wherein the part is a timepiece balance spring.

* * * * *